B. RAPPOS.
PROCESS OF WELDING CHAIN LINKS.
APPLICATION FILED SEPT. 1, 1910.

995,565.

Patented June 20, 1911.

2 SHEETS—SHEET 1.

Witnesses:
L. C. Badeau.
H. D. Penney.

Inventor: Béla Rappos,
per: H. H. Richards,
Attorney.

B. RAPPOS.
PROCESS OF WELDING CHAIN LINKS.
APPLICATION FILED SEPT. 1, 1910.

995,565.

Patented June 20, 1911.

2 SHEETS—SHEET 2.

Witnesses:
L. C. Badeau.
H. D. Penne,

Inventor:
Bela Rappos,
per: J. H. Richards
Attorney.

UNITED STATES PATENT OFFICE.

BÉLA RAPPOS, OF VIENNA, AUSTRIA-HUNGARY.

PROCESS OF WELDING CHAIN-LINKS.

995,565.   Specification of Letters Patent.   Patented June 20, 1911.

Application filed September 1, 1910. Serial No. 580,008.

*To all whom it may concern:*

Be it known that I, BÉLA RAPPOS, a subject of the Emperor of Austria-Hungary, residing at 61 Schüttelstrasse, in the city of Vienna, in the Province of Lower Austria and Empire of Austria-Hungary, have invented new and useful Improvements in the Process of Welding Chain-Links, of which the following is a specification.

This invention relates to the process of closing the gap in a chain link through which the adjacent links are hung in.

According to the invention, the gap is first formed in the swaged link by cutting out a portion somewhat broader than the thickness of the links, hereafter the two adjacent closed links are hung in, an exactly fitting piece, made of the same material as the link and of somewhat larger oval cross section is pressed into the gap, the said closing piece and the neighboring portions of the chain link are heated to welding heat, and in this state the link is placed into a welding-die, whose grooves correspond in shape to the three chain links, and upon which a suitably shaped second die is applied under strong pressure. The two dies being brought into mutual contact, the soft metal is, by the shape of the grooves in the dies, prevented from giving way along the surface of the link and consequently the metal particles at either side of the surfaces limiting the gap are compelled to interfuse the one with the other.

In order to make the invention fully understood, the same is hereinafter described with reference to the annexed two sheets of drawings, in which—

Figure 1:
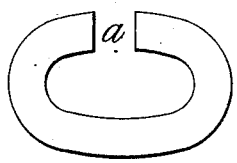
Figure 3:
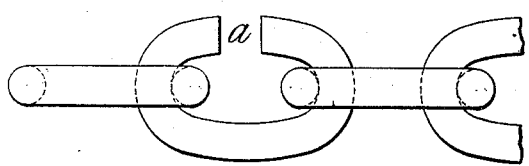
Figure 2:
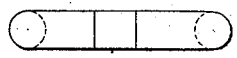
Figure 4:
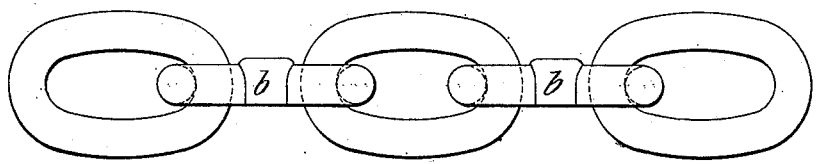
Figure 5:
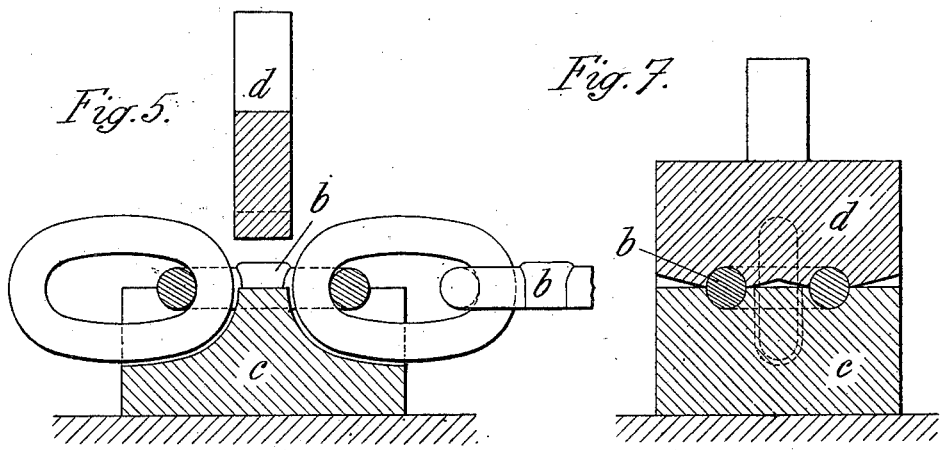
Figure 7:
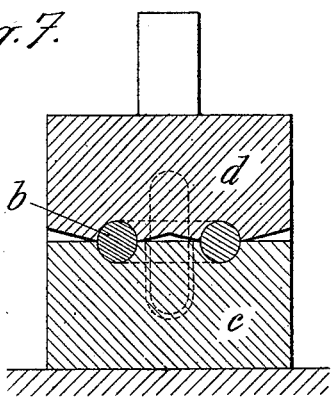
Figure 6:
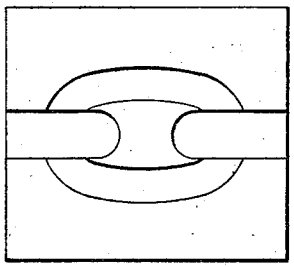
Figure 8:
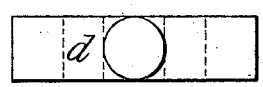
Figure 9:
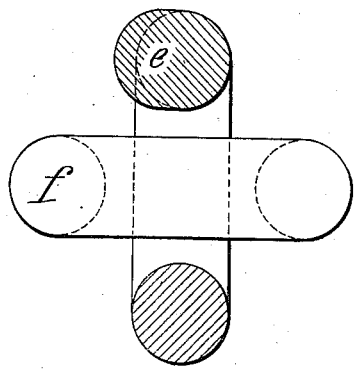
Figure 10:
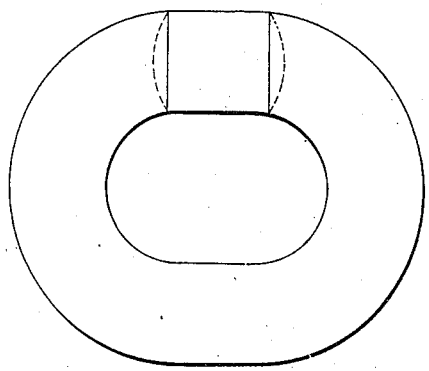
Figure 11:
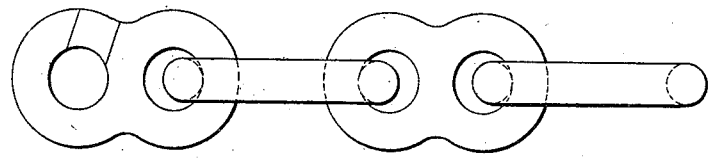
Figure 12:
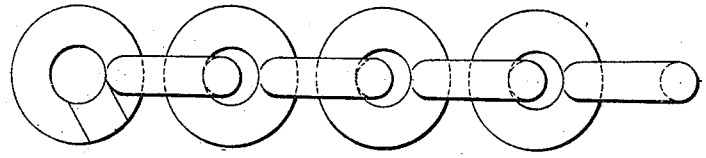

Figures 1 and 2 are a side elevation and top view respectively of an oval chain link provided with the said gap; Fig. 3 is a side elevation of the chain link with the gap having hooked into one half a portion of finished chain and into the other half a closed link; Fig. 4 shows a length of chain in top view; Fig. 5 is a sectional side elevation of the two welding-dies and a link inserted into the lower die, the upper die being not yet lowered; Fig. 6 is a top view of the lower die; Fig. 7 is a sectional elevation, at right angles to Fig. 5, of the welding-dies and the inserted link, the upper die being lowered; Fig. 8 is a top view of the upper die; Fig. 9 is a cross-section, drawn to a larger scale, of the oval link having its gap closed; Fig. 10 is a side elevation of the chain link shown in Fig. 9; Fig. 11 shows a chain with 8-shaped links, made by welding the links according to the process referred to; Fig. 12 shows a chain, in whose 8-shaped links the two eyes are distorted 90° against each other.

It will be seen from Fig. 1 that the oval chain link, preferably formed by the way of swaging, has a portion of its circumference cut out in order to form the gap $a$, the breadth of which somewhat exceeds the thickness of the links, in order to admit of a length of finished chain and a new link being hooked into the link to be welded as shown in Fig. 3. The gap $a$ is hereafter closed by the insertion of a piece $b$ made of the same metal (iron or steel) as the chain link, exactly fitting the gap, but being of oval instead of circular cross section, as shown in Fig. 9, and thus comprehending somewhat more material than would be required for filling up the gap. The filling piece $b$ and the portions of the link next the gap are now heated to welding heat and the heated parts are laid into the corresponding grooves of a welding die $c$ resting on the table of a press, whereupon the upper die $d$ is lowered by the press. As the surplus material of the piece $b$ is by the dies $c$ and $d$ prevented from giving way radially, the particles of the soft metal are compelled to interfuse the one with the other. In most cases, both ends of the filling piece $b$ bulge out in the shape of calottes as indicated by the dotted lines in Fig. 10.

From Fig. 4 it may be inferred that in chains having their links welded according to the described process, only each second link has a weld.

In the chains shown by Figs. 11 and 12 either of the two eyes of each link has a gap cut out for the insertion of a full eye of the next link.

As the surfaces of the gap and of the filling piece are in intimate contact before these parts are heated, no scales can form on the said surfaces, which interfuse with each other and, under the action of pressure, afford a weld of great strength.

Having thus described my invention, what I claim and desire to secure by Letters Patent is:

A process of welding chain links, which consists in forming a gap in a chain link, hooking into the said link the two neighboring links, closing the gap by an exactly fitting piece of the same metal and of larger cross-section than the link, heating the closing piece and the portions of the link next the gap to welding heat, and jumping the closing piece.

In witness whereof I have signed this specification in presence of two witnesses.

BÉLA RAPPOS.

Witnesses:
VICTOR KERPL,
AUGUST FUGGER.

Copies of this patent may be obtained for five cents each, by addressing the "Commissioner of Patents, Washington, D. C."